United States Patent
Minami et al.

(10) Patent No.: US 6,280,293 B1
(45) Date of Patent: Aug. 28, 2001

(54) END FACE POLISHING APPARATUS AND METHOD FOR POLISHING END FACE OF FERRULE

(75) Inventors: Kouji Minami; Mari Kato; Masaharu Sugiyama, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/418,979

(22) Filed: Oct. 14, 1999

(30) Foreign Application Priority Data

Oct. 15, 1998 (JP) .................................................. 10-293736

(51) Int. Cl.$^7$ .............................. B24B 49/00; B24B 51/00
(52) U.S. Cl. ......................... 451/10; 451/270; 451/271; 451/8
(58) Field of Search .................... 451/5, 8, 9, 10, 451/11, 28, 41, 63, 259, 270, 271

(56) References Cited

U.S. PATENT DOCUMENTS

| | | | |
|---|---|---|---|
| 4,914,867 | * | 4/1990 | Saito et al. ............................ 451/292 |
| 5,107,627 | * | 4/1992 | Mock, Jr. et al. .................... 451/271 |
| 5,503,590 | * | 4/1996 | Saitoh et al. ........................... 451/11 |
| 6,039,630 | * | 3/2000 | Chandler et al. ........................ 451/6 |
| 6,102,785 | * | 8/2000 | Chandler et al. .................... 451/271 |

* cited by examiner

Primary Examiner—Derris H. Banks
(74) Attorney, Agent, or Firm—Adams & Wilks

(57) ABSTRACT

An end face polishing apparatus comprises a jig plate for supporting a workpiece, a polishing member for polishing an end face of the workpiece, and a movable lever connected to the jig plate. A pressurizing section presses the lever to bring the end face of the workpiece into pressure contact with the polishing member. The pressurizing section has a first spring member for biasing the lever in a first direction, a pressurizing head for biasing the lever in a second direction opposite to the first direction, a second spring member for biasing the pressurizing head in the second direction, and a pressure sensor disposed between the pressurizing head and the lever for detecting a pressure applied by the end face of the ferrule onto the polishing member when the lever is pressed by the pressurizing section. A pressurization control section controls the pressure applied by the end face of the workpiece onto the polishing member when the lever is pressed by the pressurizing section.

13 Claims, 4 Drawing Sheets

END FACE POLISHING APPARATUS AND METHOD FOR POLISHING END FACE OF FERRULE

BACKGROUND OF THE INVENTION

1. Field of the Invention

The present invention relates to a pressurizing apparatus for polishing end faces of fine workpieces, and more particularly to an end face polishing apparatus for polishing to a spherical form a ferrule end face as a connector component part of an optical fiber.

2. Description of the Related Art

In recent years, optical communication is expected to become the next generation communication technology because of its high capacity and speed. Optical fibers have been introduced into our surroundings. The ferrules are formed of zirconia based ceramic material into a cylindrical form through an injection molding, extrusion or pressing technique, and used as major optical connector parts for optical fibers. Here, the ferrule has its hollow portion termed as a fiber insertion bore in which an optical fiber is inserted. Such ferrules are abutted against each other at their end faces thereby providing coupling between optical fibers. In coupling optical fibers, there is a necessity to polish ferrule end faces to a high surface roughness accuracy in order to prevent light from reflecting and attenuating at abuttment faces of the ferrules and keep a fiber optical characteristic favorable.

Conventionally, when polishing an end face of a ferrule, the ferrule has been fixed by a jig plate. Thereafter, the ferrule at an end face is pressed onto a polishing sheet that is elastically deformable by given pressure (load weight, spring force) and then the polishing sheet is rotated. By utilizing a spherical depression surface on the polishing sheet resulting from pressing the ferrule end face, the ferrule end face is polished to a spherical shape through three stages of rough, middle and fine finishes.

The conventional polishing apparatus have not had a means to control the pressure at which the ferrule end face is urged against the polishing sheet during polishing of the ferrule end face. As a result, the ferrule end face has to be urged onto the polishing sheet at a given high pressure for polishing into a spherical shape. Consequently the ferrule end face is burdened with a high application of pressure at the start of polishing operation, resulting in damage to the ferrule end face.

SUMMARY OF THE INVENTION

It is therefore an object of the present invention to provide an end face polishing apparatus which is capable of controlling the pressing force with which pressure of a ferrule end face is urged against a polishing sheet wherein, particularly at a start of polishing, the pressing force is set low to prevent against occurrence of damage to the ferrule end face. The above and other objects and novel features of the invention will became apparent from the description and attached drawings.

An end face polishing apparatus according to the present invention, comprises: a lever coupled with a jig plate for fixing a fine workpiece; a pressurizing section for moving down the lever to urge an end face of the fine workpiece onto an elastically deformable polishing sheet; and a pressurization control section for controlling the pressure applied to the fine work piece when urged onto the polishing sheet by the pressurizing section.

Furthermore, the pressurizing section is formed by a motor for pressurizing the fine workpiece, a screw for moving down the lever by rotation of the motor, and a pressure sensor for detecting urge pressure of an end face of the fine workpiece onto the polishing sheet and feed back detected urge pressure to the pressurization control section. The pressurization control section controls urge pressure of the fine workpiece end face onto the polishing sheet.

Furthermore, the pressurization control section comprises a memory device for outputting a set pressure signal to urge the fine workpiece end face onto the polishing sheet, a comparator for comparing between an urge set pressure signal given from the memory device and an urge pressure detection signal given from the pressure sensor and calculating a difference between the urge set pressure signal and the urge pressure detection signal, a pressure corrector for correcting an urge pressure of the fine workpiece onto the polishing sheet depending on a difference between the urge set pressure signal and the urge pressure detection signal, and a pressurization driver for driving the motor to bring the urge pressure of the fine workpiece end face onto the polishing sheet to an urge pressure corrected by the corrector.

Furthermore, the fine workpiece is a ferrule as a connector component part of an optical fiber.

Accordingly, in the invention after a ferrule for example is fixed, the jig plate is installed on a lever and the lever is moved down by rotation of the motor. Thus, the fine workpiece at its end face is urged at predetermined pressure against the polishing sheet.

On this occasion, the pressure sensor detects an urging force of the fine workpiece end face onto the polishing sheet. The comparator compares between an urge set pressure signal memorized in the set pressure memory device and an urge pressure detection signal given from the pressure sensor. Calculated is a difference between the urge set pressure signal and the urge pressure detection signal.

Then, the corrector corrects for the urge pressure of the fine workpiece end face onto the polishing sheet depending on the difference between the urge set pressure signal and the urge pressure detection signal. The driver drives the motor such that the urge pressure of the fine workpiece end face onto tire polishing sheet becomes corrected urge pressure by the corrector Thus, the polishing sheet is rotated thereby polishing the fine workpiece end face into a spherical shape.

In this manner, the invention can control the urge pressure of the fine workpiece end face onto the polishing sheet. It is possible to prevent damage from occurring in the fine workpiece end face by setting low the urge pressure of the fine workpiece end face particularly at a start of polishing.

DETAILED DESCRIPTION OF THE PREFERRED EMBODIMENT

Figure 1:
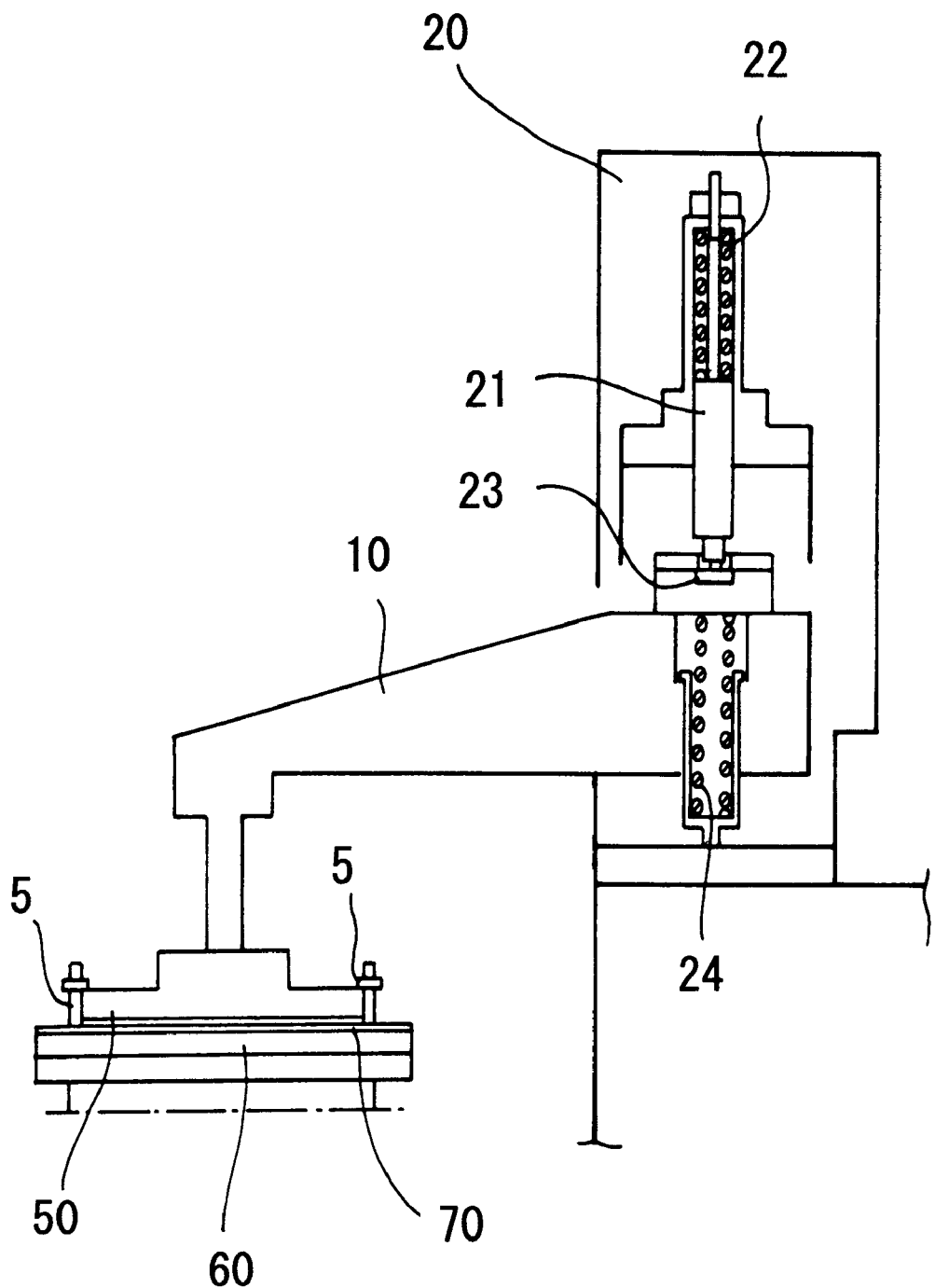
FIG. 1 is a front view of an end face polishing apparatus according to one embodiment of the present invention.
Figure 2:
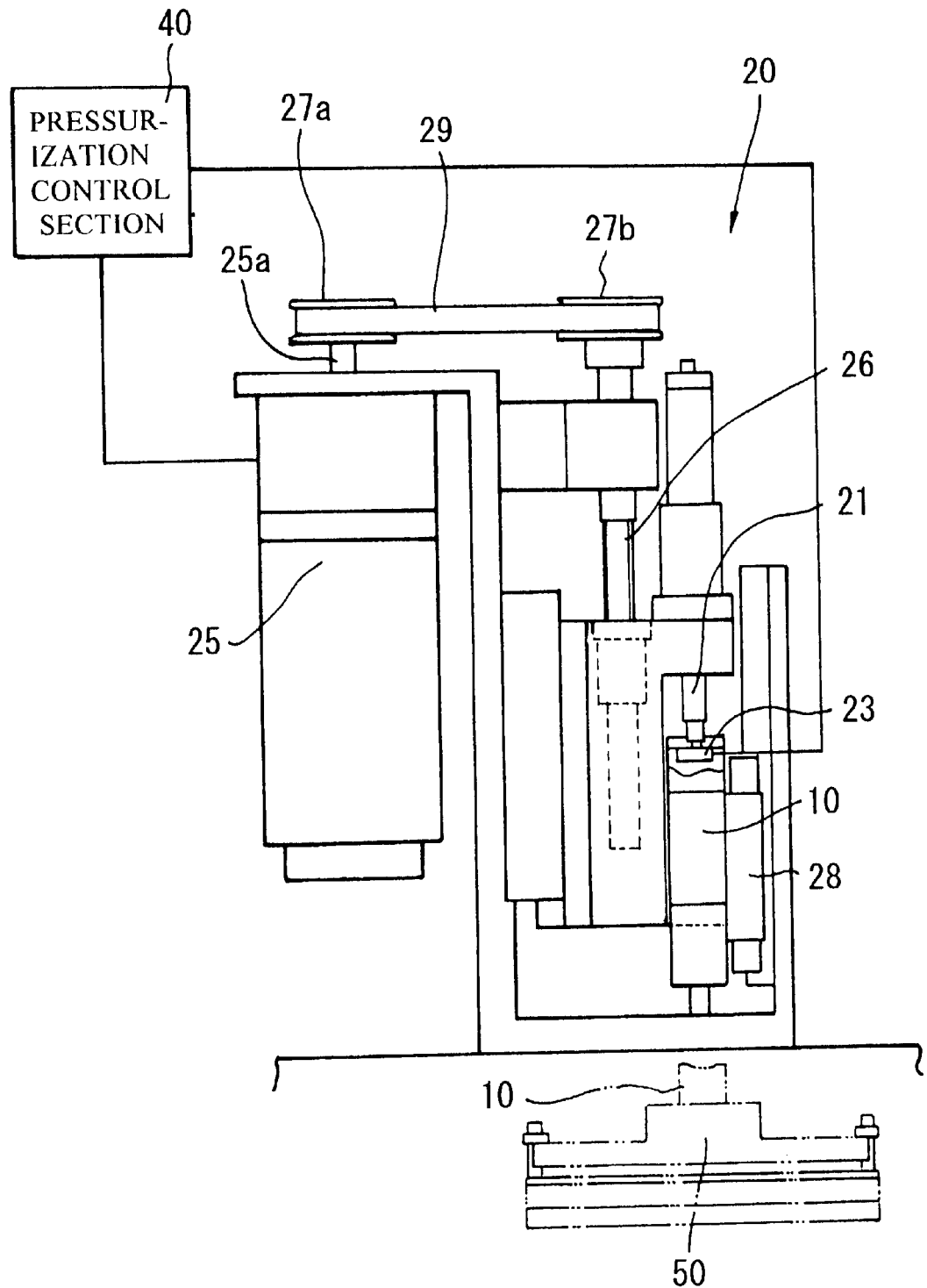
FIG. 2 is a side view of the end face polishing apparatus according to the one embodiment of the present invention.
Figure 3:
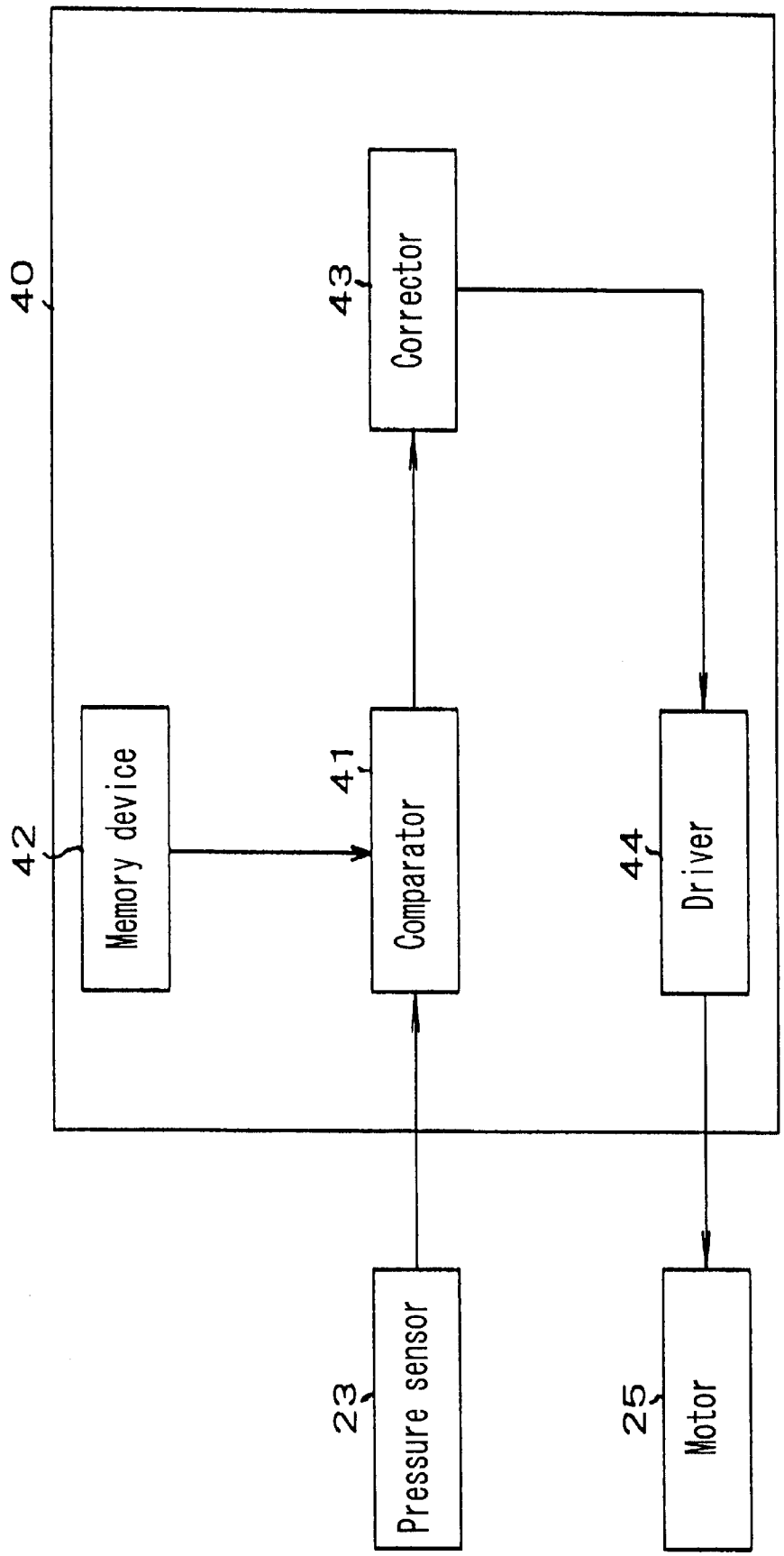
FIG. 3 is a block diagram of the end face polishing apparatus according to the one embodiment of the invention.
Figure 4:
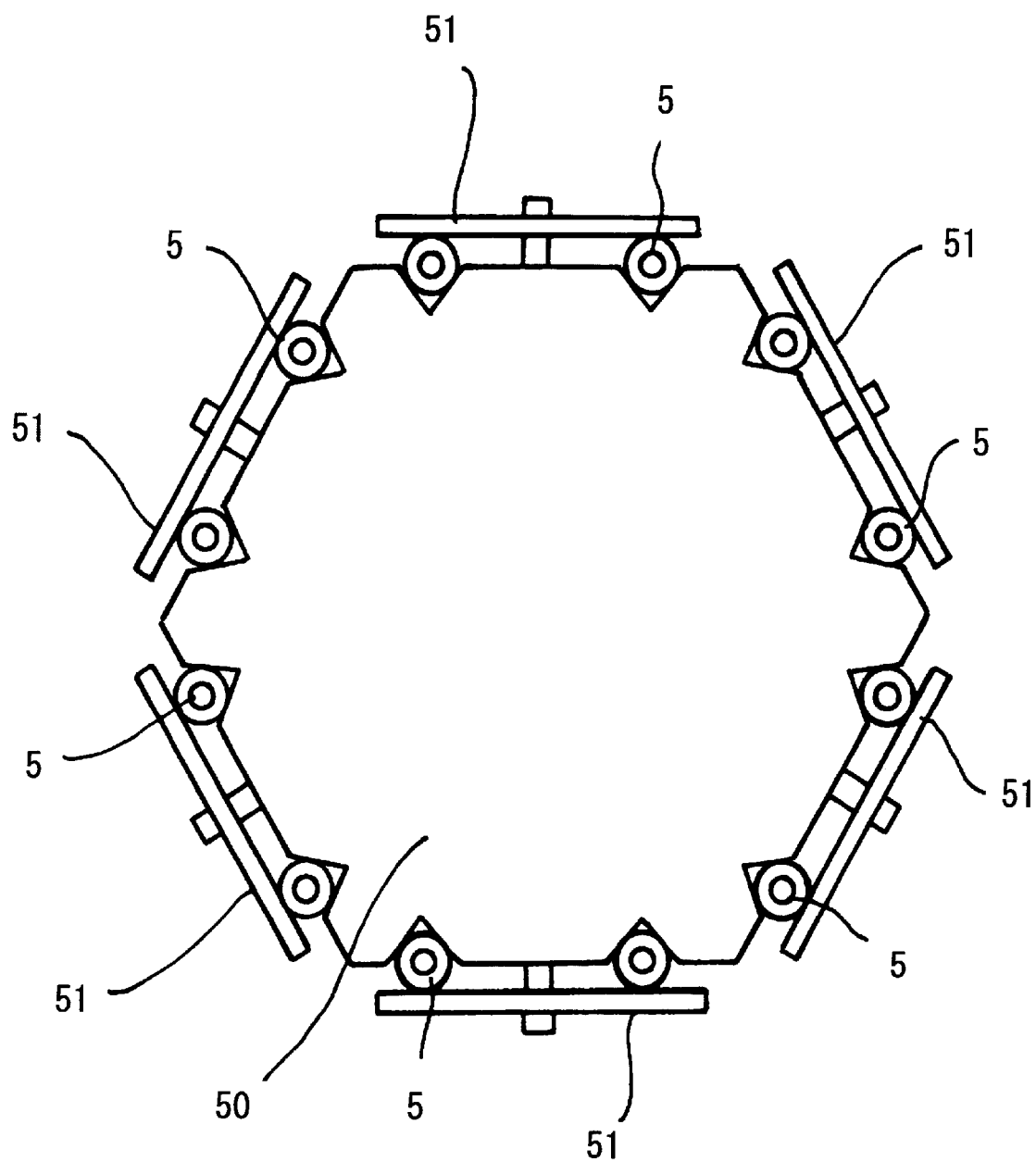
FIG. 4 is a plan view showing a state that ferrules are fixed in the end face polishing apparatus according to the one embodiment of the invention.

Now embodiments of the present invention will be described with reference to the drawings. FIG. 1 is a front view of an end face polishing apparatus according to one embodiment of the invention. FIG. 2 is a side view of the end face polishing apparatus of the one embodiment of the invention. FIG. 3 is a plan view showing a state that the end face polishing apparatus according to the one embodiment of the invention is fixed on a jig plate. FIG. 4 is a block diagram of a pressurization control section of the end face polishing apparatus according to the one embodiment of the invention.

Referring to FIG. 1, an elastically deformable polishing sheet 70 is placed on a top surface of a polishing plate 60 that is movable by one or a combination of rotation, revolution and swing. Then, a jig plate 50 is arranged over the polishing sheet 70 to fix therein ferrules 5 at opposite ends so that end faces of the ferrules 5 can be in contact with a surface of the polishing sheet 70. Here, the jig plate 50 is connected to one end of a lever 10, for downward pressurization. Thus, the ferrules 5 at their end faces are pressurized against the surface of the polishing sheet.

Next, a lower spring 24 is arranged in the lever 10 in the vicinity of its opposite end to the end connected with the jig plate 50, thus pushing up the lever 10. Then, a pressure sensor 23 is arranged over a position of the lever 10 facing the lower spring 24 in order to detect a pressure for pressurizing the jig plate 50. Here, the pressure sensor uses a load cell.

Then, a pressurizing head 21 is arranged such that its lower end contacts an upper surface of the pressure sensor 23. An upper spring 22 is placed on the pressurizing head 21 to urge the pressurizing head 21. In the present invention, the lever 10 is compressed by the lower spring 24 and the upper spring 22 so that the load of the lever 10 or the lever 10 and jig plate 50 can be canceled by the lower spring 24, thus providing zero balance. As a result, it is possible to detect only a load pressurizing the lever 10 from the above by the pressure sensor 23. Consequently, even if the kind of the lever 10 or jig 50 or the kind or number of ferrules 5 is changed, a polish load can be accurately detected.

In the figure, the lever 10, upper spring 22, pressurizing head 21, pressure sensor 23 and lower spring constitute part of the pressurizing section 20. Next, the pressurizing section 20 is shown in FIG. 2.

The pressurizing section 20 has a mechanism to vertically move the lever 10. The lever 10 is coupled to the pressurizing head 21 through the pressure sensor 23 for detecting pressure. The pressurizing head 21 and the lever 10 are vertically moved by rotation of a screw 26. The screw 26 acts to deliver a force to pressurize the lever 10 to the jig plate 50.

Also, a guide 28 is provided to correctly move the lever 10. The guide 28 uses a linear guide. This eliminates detection of pressure due to horizontal deflection of the lever 10, thus improving the S/N ratio.

The screw 26 transmits the rotation of the motor 25 through a shaft 25*a*, pulley 27*a*, belt 29 and pulley 27*b*, for rotation. Thus, the lever 10 is vertically moved. The load applied by the rotation of the motor 25 is detected by the pressure sensor 23. The pressurization control section 40 supplies power to drive the motor 25, thus configuring a pressurizing control circuit.

Referring to FIG. 3, the pressurization control section 40 is shown. The detection output from the pressure sensor 23 is inputted so that comparator 41 compares it with a value memorized by a memory device 42 for memorizing pressure values. A corrector 43 creates data to correct the pressure based Dn a target pressure, and inputs its output to a driver 44, thereby outputting an electric power to drive the motor 25.

FIG. 3 shows the configuration including the comparator 41 and the corrector 43. However, it is possible to use a system having an A/D converter for converting an output of the pressure sensor 23, a memory device for memorizing a control program or set pressure, a CPU for comparing and calculating these detection values with a predetermined pressure value to determine output data for driving the motor 25, and a D/A converter for converting an output of the CPU.

According to the invention, the pressure applied to ferrule end faces can be controlled to a predetermined set value with a result that the load applied to the ferrule end faces being polished can be brought to a constant value.

Furthermore, the load can be decreased in a state that an optical fiber at its end is exposed from a ferrule end in an initial stage of ferrule polishing, and the polish load is increased when the optical fiber and the ferrule become flush with one another at their end faces thereby preventing the optical fiber from becoming cracked or fractured at its end. Thus, polishing can be done at high speed. Here, the load can be switched by a method to designate with a timer provided in the pressurization control section 40 or a method to calculate a real-time clock value. Furthermore, it is possible to detect a current of the motor 25 and a motor current to drive the polishing plate 60, to thereby detect the end of a polish operation from a motor drive load, i.e. a state in which intial polishing of the optical fiber has ended and has a face flush with the ferrule.

Meanwhile, it is possible as another polish state detecting method to determine a state of contact of a ferrule end with the polishing sheet 70 from a relationship between a feed amount of the screw 26 and a pressure change based on a relationship between a drive to the motor 25 and an output of the pressure sensor 23. This method makes it possible to detect a point that an optical fiber and a ferrule is coincident in their end faces or to detect an occurrence of cracks or a fracture in the optical fiber. In the case where detecting a pressure value exceeding a designated value, abnormality is determined to stop the operation of the polishing apparatus. Thus, it is possible to reduce the polishing time as compared to the time required for a polishing ferrules of poor quality.

Meanwhile, it is possible to increase the polish rate and prevent damage in polish from occurring by setting a pressure value related to a polish load great during rough finish and decreasing as the process proceeds to middle finish and to accurate finish.

Besides, the setting pressure can be varied depending on a kind of polish agent used, a polish agent particle size, a ferrule material, a ferrule tip shape and a difference in ferrule diameter. An optimal polish condition can be selected for meeting a purpose.

Referring to FIG. 4, there is shown the jig plate 50 of the invention, wherein a hexagon has each side fixed with two ferrules 5 clamped by a fixing block 51.

In this manner, the end face polishing apparatus of the present embodiment can control the urge pressure of the ferrules 5 onto the polishing sheet 70. By setting low the urge pressure of the ferrules 5 end faces, the ferrules 5 can be damage to the end faces of prevented.

As will be understood from the above explanation, the end face polishing apparatus of the invention is provided with a pressurization control section for controlling as the pressing force with which a fine workpiece end face is urged onto a polishing sheet. This makes it possible to control the urge pressure of the fine workpiece end face onto the polishing sheet. In particular the urge pressure of the fine workpiece end face can be set low at a start of polishing. Accordingly, the fine workpiece end face is prevented from being damaged. Furthermore, the accuracy of end face polishing can be improved by varying the urging pressure of the fine workpiece end face depending on a material or strength of the fine workpiece and a polishing stage of rough, middle or precise finish.

What is claimed is:

1. An end face polishing apparatus comprising:

a jig plate for supporting a workpiece having an end face;

a polishing sheet for polishing the end face of the workpiece;

a movable lever connected to the jig plate;

a pressurizing section for pressing the lever to bring the end face of the workpiece into pressure contact with the polishing sheet, the pressurizing section having a first spring member for biasing the lever in a first direction, a pressurizing head for biasing the lever in a second direction opposite to the first direction, a second spring member for biasing the pressurizing head in the second direction, and a pressure sensor disposed between the pressurizing head and the lever for detecting a pressure applied by the end face of the workpiece onto the polishing sheet when the lever is pressed by the pressurizing section; and a pressurization control section for controlling the pressure applied by the end face of the workpiece onto the polishing sheet when the lever is pressed by the pressurizing section.

2. An end face polishing apparatus according to claim 1; wherein the biasing forces applied by the first and second spring members of the pressurizing section are selected so as to cancel the loads applied to the lever by the first spring member and the pressurizing head in the first and second directions, respectively.

3. A method for polishing an end face of a ferrule, comprising the steps of:

supporting a ferrule with a first spring member for applying a biasing force in a first direction and a second spring member for applying a biasing force in a second direction opposite the first direction to balance the ferrule in a zero-load state;

pressing an end face of the ferrule against a surface of a polishing sheet;

detecting a pressure applied by the end face of the ferrule against the polishing sheet; and adjusting the pressure applied by the ferrule against the polishing sheet to a preselected pressure.

4. A method for polishing an end face a ferrule, comprising the steps of:

providing a ferrule having an optical fiber having an end exposed from an end face of the ferrule;

polishing the end of the optical fiber while applying a first pressure to the end of the optical fiber; and polishing the end face of the ferrule while applying a second pressure higher than the first pressure to the end face of the ferrule.

5. An end face polishing apparatus comprising: a jig plate for supporting at least one workpiece; a polishing member for polishing an end face of the workpiece; a lever connected to the jig plate; first biasing means for applying a biasing force to the lever in a first direction to bring the end face of the workpiece into pressure contact with the polishing member; second biasing means for applying a biasing force to the lever in a second direction opposite to the first direction to release the pressure contact between the end face of the workpiece and the polishing member; and control means for controlling the pressure applied by the end face of the workpiece against the polishing member.

6. A polishing apparatus according to claim 5; wherein the control means includes means for adjusting the biasing forces applied to the lever by the biasing means to adjust the pressure applied by the end face of the workpiece against the polishing member.

7. A polishing apparatus according to claim 5; wherein the biasing forces applied by the first and second biasing means are selected so as to cancel respective loads applied to the lever by the first and second biasing means in the first and second directions.

8. A polishing apparatus according to claim 5; further comprising detecting means for detecting the pressure applied by the end face of the workpiece against the polishing member; and wherein the control means includes means for adjusting the pressure applied by the end face of the workpiece against the polishing member in accordance with the pressure detected by the detecting means.

9. A method of polishing an end face of a ferrule, comprising the steps of: supporting at least one ferrule with a first spring member for applying a biasing force in a first direction and a second spring member for applying a biasing force in a second direction opposite the first direction to balance the ferrule in a zero-load state; pressing an end face of the ferrule against a surface of a polishing member; effecting relative movement between the end face of the ferrule and the surface of the polishing member to polish the end face of the ferrule; detecting a pressure applied by the end face of the ferrule against the surface of the polishing member; and adjusting the pressure applied by the end face of the ferrule against the surface of the polishing member in accordance with the detected pressure.

10. A method according to claim 9; wherein the detecting step is conducted during the polishing step.

11. A method for polishing a ferrule having an optical fiber, comprising the steps of: providing a ferrule having an end face and an optical fiber having an end extending from the end face of the ferrule; pressing the end of the optical fiber against a polishing member with a first pressure; effecting relative movement between the end of the optical fiber and the polishing member to polish the end of the optical fiber; pressing the end face of the ferrule against the polishing member with a second pressure higher than the first pressure; and effecting relative movement between the end face of the ferrule and the polishing member to polish the end face of the ferrule.

12. A method of polishing an end face of a workpiece, comprising the steps of: providing a jig plate supporting at least one workpiece; supporting the jig plate in a zero-load balanced state by applying equal biasing forces on the jig plate in opposite directions; pressing an end face of the workpiece against a surface of a polishing sheet; detecting a pressure applied by the end face of the workpiece against the polishing sheet; and adjusting the pressure applied by the workpiece against the polishing sheet to a preselected pressure.

13. A method according to claim 12; wherein the supporting step comprises supporting the jig plate in a zero-load balanced state by applying equal biasing forces on the jig plate in opposite directions using a pair of spring members disposed in an aligned state.

* * * * *